Figure 1:
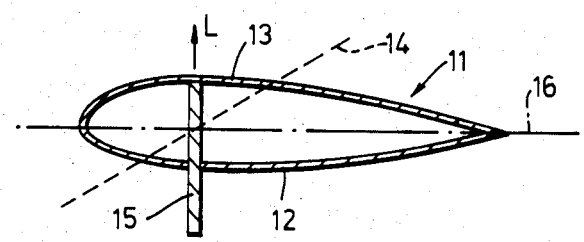

United States Patent [19]

Lawson-Tancred

[11] Patent Number: 4,692,095

[45] Date of Patent: Sep. 8, 1987

[54] WIND TURBINE BLADES

[75] Inventor: Henry Lawson-Tancred, Boroughbridge, United Kingdom

[73] Assignee: Sir Henry Lawson-Tancred, Sons & Co. Ltd., Boroughbridge, United Kingdom

[21] Appl. No.: 816,127

[22] PCT Filed: Apr. 23, 1985

[86] PCT No.: PCT/GB85/00173

§ 371 Date: Dec. 12, 1985

§ 102(e) Date: Dec. 12, 1985

[87] PCT Pub. No.: WO85/04930

PCT Pub. Date: Nov. 7, 1985

[30] Foreign Application Priority Data

Apr. 26, 1984 [GB] United Kingdom ............... 8410669
Sep. 26, 1984 [GB] United Kingdom ............... 8424339
Mar. 8, 1985 [GB] United Kingdom ............... 8506060

[51] Int. Cl.<sup>4</sup> ............................................... F03D 7/04
[52] U.S. Cl. ......................................... 416/23; 416/32; 416/169 R; 416/236 R
[58] Field of Search .............. 416/169 B, 23, 24, 32, 416/DIG. 7, 236 R; 415/DIG. 1 A

[56] References Cited

U.S. PATENT DOCUMENTS

| 838,837 | 12/1906 | Ayers | 416/236 R |
| 1,718,869 | 6/1929 | Nias | 416/236 R |
| 1,786,057 | 12/1930 | Fales | 416/148 X |
| 2,058,500 | 10/1936 | Plucker | 416/23 X |
| 2,076,520 | 4/1937 | Swanson | 416/87 |
| 2,148,921 | 2/1939 | Allen | 416/23 |
| 2,485,543 | 10/1949 | Andreau | 416/23 X |
| 2,493,895 | 1/1950 | Osterback | 416/23 X |
| 4,180,372 | 12/1979 | Lippert | 416/23 |
| 4,355,955 | 10/1982 | Kisovec | 416/23 |
| 4,374,631 | 2/1983 | Barnes | 416/23 |
| 4,557,666 | 12/1985 | Baskin et al. | 416/32 |
| 4,575,309 | 3/1986 | Brown | 416/32 |

FOREIGN PATENT DOCUMENTS

| 50055 | 8/1895 | Canada | 416/236 R |
| 2829716 | 1/1979 | Fed. Rep. of Germany | 416/23 |
| 2908761 | 9/1980 | Fed. Rep. of Germany | 416/23 |
| 968411 | 11/1950 | France | 416/23 |
| 61140 | 3/1955 | France | 416/236 R |
| 49585 | 4/1980 | Japan | 416/23 |
| 272377 | 4/1951 | Switzerland | 416/23 |
| 206160 | 7/1924 | United Kingdom | 416/23 |
| 578710 | 7/1946 | United Kingdom | 416/24 |
| 720591 | 12/1954 | United Kingdom | 416/23 |

Primary Examiner—Everette A. Powell, Jr.
Attorney, Agent, or Firm—Lane and Aitken

[57] ABSTRACT

Wind turbine blades for use e.g. in generating electricity are described in which the blades have fixed lift spoilers in the form of deep spars projecting on the normally high pressure side of the blades where they are relatively ineffective, but which, in down-wind operation of the turbine, are on the low pressure side which generates (but for the spars) substantially all the lift and are therefore very effective. Active spoilers are also disclosed on the low pressure side of the blade rapidly deployable to control an overspeed condition. The whole is controlled by a computer to maintain desirably constant tip speed ratio, the variable rotor speed being converted hydraulically or electrically to constant frequency current, or to maintain a constant turbine speed to generate constant frequency current with overspeed protection.

27 Claims, 13 Drawing Figures

WIND TURBINE BLADES

This invention relates to wind turbine blades and to wind turbines incorporating the same.

Wind turbine blades have been fashioned in many different configurations and wind turbines themselves operate according to different philosophies depending at least to some extent on the use to which the turbine is put. Wind turbines are commonly used to generate electricity, and can be connected directly or indirectly to a generator. It is often desired to generate current at a predetermined frequency, and direct connection then requires either that the turbine be operated at constant speed, or that a variable frequency output be converted in for example a static converter to a fixed frequency.

A variable speed fixed pitch turbine may be operated for optimum power capture at constant tip speed ratio, for example by altering the torque reaction on the turbine shaft with the shaft speed.

Overspeed conditions can be controlled by braking means acting on the turbine shaft. Variable pitch blades can be feathered in high wind conditions, and in any event the blades may be designed to stall in certain conditions so as to avoid overspeeding.

The use of centrifugally operated air brakes has also been proposed, such brakes being arranged for example at the blade tips and set to fly out against a resilient bias at a predetermined rotational speed.

The choice of airfoil section and blade configuration generally for wind turbines is based on different considerations than apply to airplane wings, propellers and helicopter rotor blades. A major consideration in the case of wind turbines is rigidity. Another major consideration is that the wind to which the turbine is subjected is itself subject to rapid and substantial fluctuation both as to speed and direction, which cannot often be accommodated by correspondingly rapid pitch changing and which can put substantial strain on the blades and on the transmission.

The present invention provides a solution to these problems.

The invention comprises a wind turbine blade having a first side which in ordinary operation is a high pressure side and a second side which in ordinary operation is a low pressure side, which sides can, in abnormal operation, become reversed, so that the said first side becomes the low pressure side and the said second side becomes the high pressure side, said blade having spoiler means automatically deployed on the low pressure side in abnormal operation.

Said spoiler means may be permanently deployed on said first side and may comprise a blade spar or part thereof. Such blade spar may have a greater depth than the depth from said first to said second side and extend from said second side to beyond said first side. Said spar may be about twice the depth of the blade from said first to said second side.

Said spar may comprise a rigid plate extending substantially perpendicularly to the chord of an airfoil section comprising said first and said second side. Said spar may otherwise comprise a box section, and may comprise a triangular box section having a base adjacent the said second side and an apex projecting from said first side.

Said first side of said blade may be substantially wholly or partly open between the leading and trailing edges of the blade.

Said blade may be essentially of a conventional airfoil section forward of said spoiler means and essentially comprise only the low pressure side of a conventional airfoil section aft of said spoiler means.

Said blade may have spoiler means on said second side deployable between an inactive position during normal operation and an active position during abnormal (high speed) operation so as to extend from said second side (while said second side remains the low pressure side) to retard the blade. Said spoiler means may comprise a plate member lying in its inactive position flush or substantially so with the surface of said second side and in its active position standing up from said second side substantially perpendicular thereto. Said spoiler means may be actuated by motor means disposed inboard of the blade, and such motor means may operate winch means attached by a cable or like member to said spoiler means.

Said spoiler means may be deployable under centrifugal force and/or by a resilient bias; such bias may be adjustable.

Multiple independent spoiler sections may be disposed lengthwise of said blade; where such spoiler sections are deployable, they may be independently deployable and may be progressively deployable to their active positions from inboard to outboard of the blade at increasing blade speeds.

The spoiler means may automatically deploy in the event of system malfunction. Electrically energised means may hold said spoiler means in their inactive position against a bias, so that on electric supply failure the spoiler means are deployed to their active position.

The invention also comprises a wind turbine comprising such blade means, and also comprises such a wind turbine connected to drive an electric generator.

The turbine may include shaft and wind speed sensing means actuating said spoiler means to control turbine speed.

Figure 2:
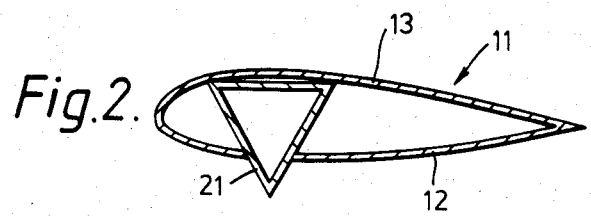
Figure 3:
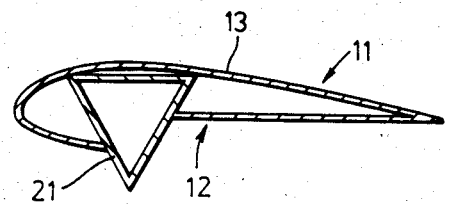
Figure 4:
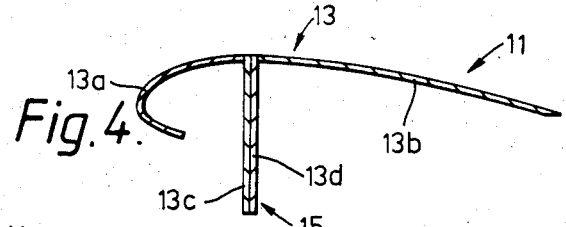
Figure 5:
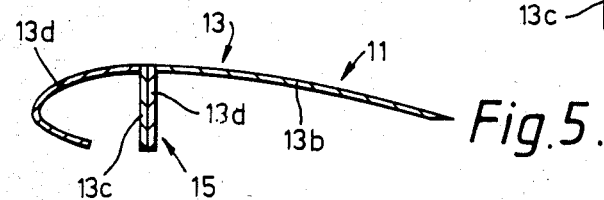
Figure 6:
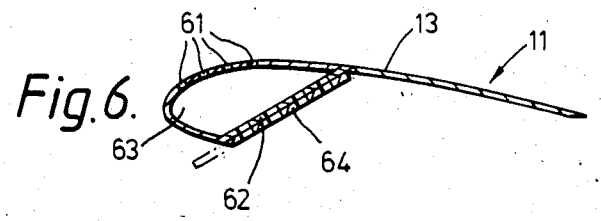
Figure 7:
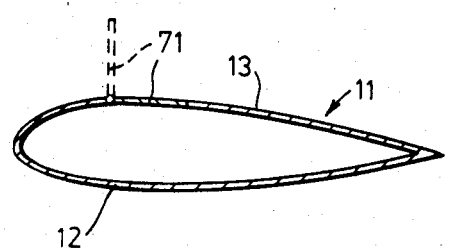
Figure 8:
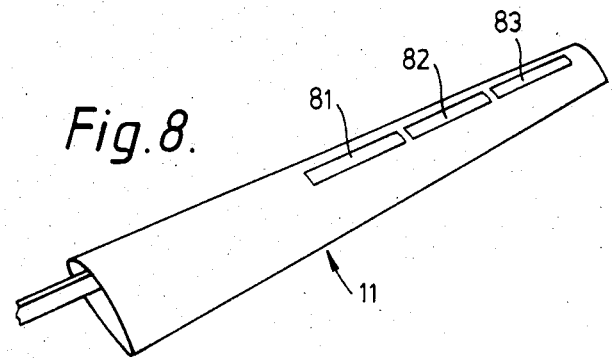
Figure 9:
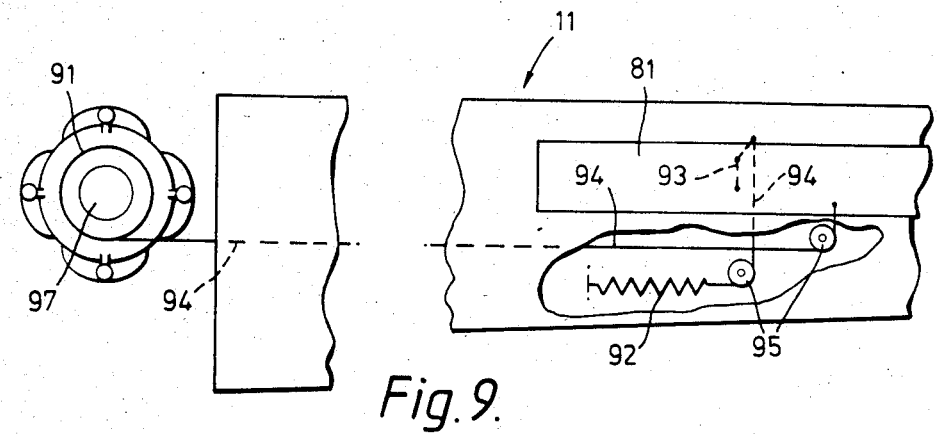
Figure 10:
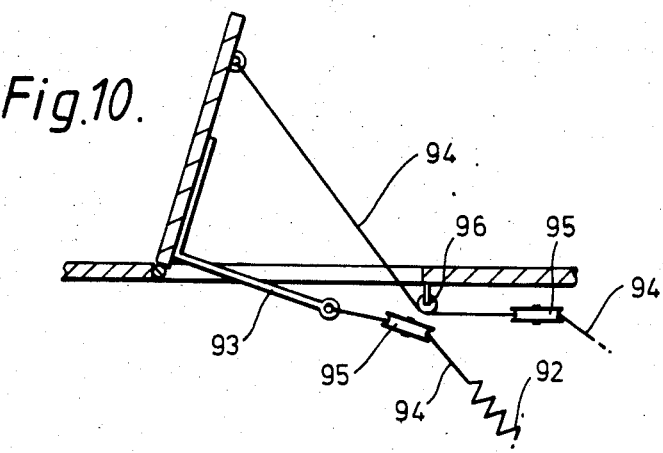
Figure 11:
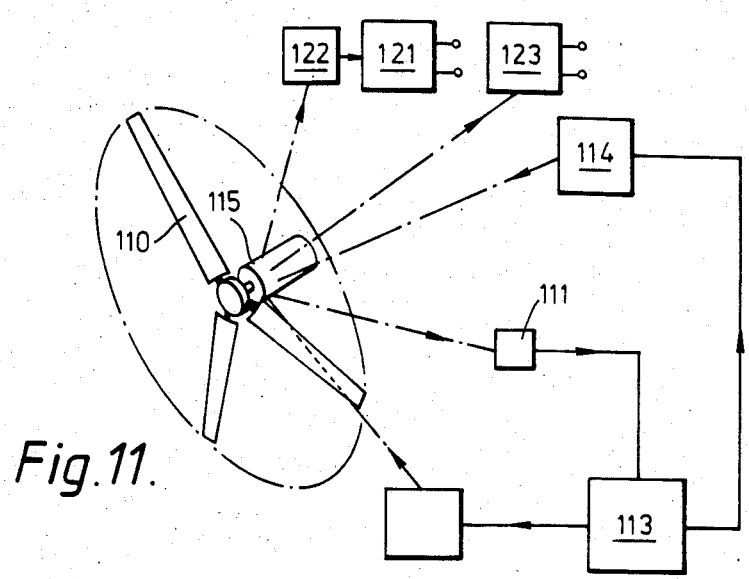
Figure 12:
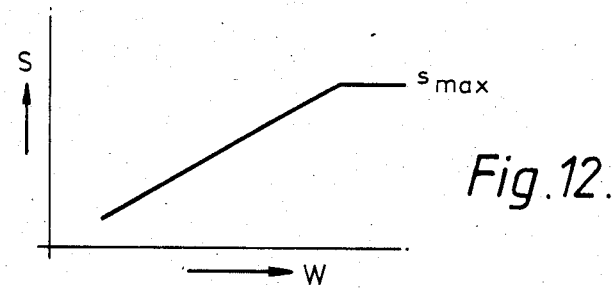
Figure 13:
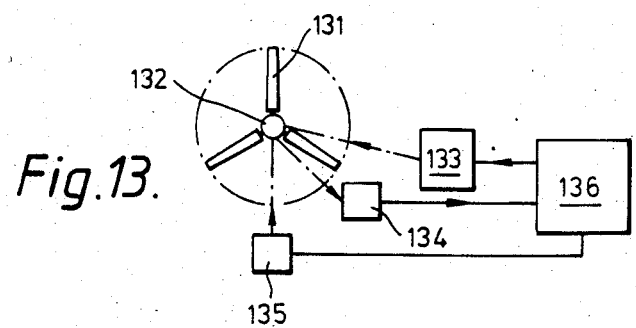

Embodiments of wind turbine blades and wind turbines incorporating the same will now be described with reference to the accompanying drawings, in which:

FIG. 1 is a cross-section of a first wind turbine blade,
FIG. 2 is a cross-section of a second turbine blade,
FIG. 3 is a cross-section of a third turbine blade,
FIG. 4 is a cross-section of another turbine blade,
FIG. 5 is a cross-section of yet another turbine blade,
FIG. 6 is a cross-section of a further turbine blade,
FIG. 7 is a cross-section of a turbine blade with deployable spoilers,
FIG. 8 is a perspective view of a blade of the kind shown in cross-section in FIG. 7,
FIG. 9 is a plan view of part of a blade like the blade shown in FIGS. 7 and 8,
FIG. 10 is a section on an enlarged scale of a part of the blade of FIG. 9,
FIG. 11 is a diagrammatic illustration of a control system for a wind turbine generator,
FIG. 12 is a graph of turbine rotational speed against wind speed for the system illustrated in FIG. 11, and
FIG. 13 is a diagrammatic illustration of another control system for a wind turbine generator.

FIG. 1 illustrates in cross-section a wind turbine blade 11 having an envelope which defines an airfoil profile having a first side 12 which in ordinary operation is a high pressure side, a second side 13 which in ordinary operation is a low pressure side, a leading edge and a trailing edge. In ordinary operation there is therefore a lift component indicated by the arrow L which effects rotation of the wind turbine about its axis indicated by broken line 14.

Spoiler means 15, in the form of a blade spar, are permanently deployed on said first side 12. The spar 15 comprises a rigid plate, on which the structure of the blade 11 is carried extending substantially perpendicularly to the chord 16 of the airfoil section comprising the said first and second sides 12, 13, and has a greater depth than the depth from said first side 12 to said second side 13, in fact about twice that depth, and thus extends from said second side 13 to beyond said first side 12.

In normal operation with the spoiler means 15 on the high pressure side it is found that the performance of the blade is scarcely affected by the presence of the spoiler means, most of the lift coming from the low pressure side, which is side 13. If anything, the spoiler 15 increases lift, in normal operation, while also increasing form drag.

If an abnormal situation arises, however, in which the turbine runs down-wind, the spoiler will then be on the low pressure side and will act to reduce lift substantially, thereby retarding the turbine.

Such an abnormal situation can arise through a rapid change in wind direction even with a wind turbine which has a control arrangement which is intended to keep it headed into wind. The present arrangement, in which down-wind operation will not lead to overspeeding on account of the spoiler which is in that abnormal situation, brought into play, avoids the need for arrangements which keep the turbine headed into wind, and thus reduces the cost and complexity and hence reduces the generating costs, of wind turbine arrangements.

Another arrangement for a wind turbine blade is illustrated in cross section in FIG. 2, in which, instead of the rigid plate member, the spar 15 is composed of a triangular box-section member 21.

FIG. 3 shows, in cross-section again, an arrangement like that of FIG. 2 but in which a part of the airfoil section on the first side 12, is cut away. FIG. 4 shows an arrangement in which the said second side 13, ordinarily the low pressure side of the turbine, is formed out of two half shells 13a, 13b with flanges 13c, 13d respectively, that are secured together to form a spar/spoiler 15.

The particular advantage of the above described arrangements is that the spar 15 is a strengthening number having a substantial depth which affords a high rigidity to the blade 11 against both bending (flat-wise bending) and twisting. The fact that the spar 15, by its substantial depth, affords air braking in abnormal operation without imposing any substantial penalty in normal operation, enables lightweight blades to be made capable of high performance which are also relatively inexpensive as compared to conventional blades.

FIG. 5 shows an arrangement like FIG. 4 but in which the spar 15 extends only down to a level within the notional airfoil section. Such spar 15 nevertheless makes a substantial contribution to the rigidity of the spar and also acts, together with the asymmetric blade construction, as a spoiler in abnormal operation.

A further section is shown in FIG. 6, in which a half-shell section like that of FIG. 5 is provided on the leading edge of its second side 13 with a series of apertures 61 and with a perforated plate 62 enclosing a leading edge section 63 of the blade. The perforated plate 62 has a slidable similarly perforated companion plate 64 which can be moved with respect to the plate 62 to open or to close off the perforations therein. The effect of this is to render the apertures 61 active or inactive as lift spoiler means. Such a construction has the advantage that it automatically destroys lift during downwind operation of the blade, and that lift can be furthermore controlled during overspeed operation with the turbine pointing the right way into the wind.

Finally, on profiles, FIG. 7 illustrates an airfoil section having a first, normally high pressure, side 12 and a second, normally low pressure, side 13. Spoiler means 71 are automatically deployed on the low pressure side 13 in abnormal, which is in this case to say overspeed, operation. Such spoiler means 71 are deployable between an inactive (solid line) position and an active (broken line) position so as to extend from said second side 13 while said second side 13 remains the low pressure side, to retard the blade. The spoiler means 71 comprise a plate member lying in its inactive position flush with the surface of said second side and in its active position standing up from said second side substantially perpendicular thereto.

Such plate member may be capable of being arrested in an intermediate position between said inactive, flush, and said active, perpendicular positions for graduated effect, as will be hereinafter explained.

Whereas with the 'permanently deployed' spoilers of FIGS. 1 to 4 the depth of the spar 15 may taper from the root to the tip of the blade, and the spar 15 may in fact not protrude from the said first surface beyond a distance of a third to a half way out from the blade root, the active spoiler of FIG. 7 may be more effectively mounted at outer radius of the blade and may as shown in FIG. 8 comprise three independently operated sections 81, 82, 83 which may be arranged to be actuated in sequence starting with the inboard spoiler section 81.

FIGS. 9 and 10 illustrate how each section 81, 82, 83 of FIG. 8 is actuated. An electric winch 91 located inboard of, for example in the hub of, the blade 11 pulls the spoiler 81 closed against the bias of a spring 92 acting on a bell crank 93 tending to urge the spoiler 81 open. Suction on the low pressure side of the blade also tends to urge the spoiler open. The spring 92 and the winch 91 act through heavy duty plastic rope or cable 94 running over pulleys 95 and through rope guides 96. Centrifugal force also plays at least some part in urging the spoiler open at least by virtue of tending to fling the rope 94 out towards the blade tip.

An electrically operated clutch 97 normally holds the spoiler 81 closed, in its flush-mounted position. However, on an abnormal, which is in this case to say overspeed condition, the clutch 97 releases the rope 94 and the spoiler 81 opens out under the influences of the spring 92, centrifugal force and the suction on the low pressure side of the blade.

This destroys lift and retards the blade. If the speed is reduced too much, the winch 91 is actuated to pull in the rope 94 and retract the spoiler 81.

The slidable, perforated plate of FIG. 6 can also be actuated by similar winch means, of course.

The winch 91 and clutch 97 are controlled by a controller or computer 113 or 136 as illustrated in FIGS. 11 and 13 to activate the spoilers at high wind speed or high turbine shaft speed and to deactivate them at reduced such speed or speeds. Each spoiler 81, 82, 83 may have its own winch and clutch arrangement for independent if desired progressive actuation under the control of a computer, or all three might be operated simultaneously by a single winch/clutch arrangement.

In any event, the winch 91 may pull in the rope 94 to different extents to retract the spoiler 81 to an intermediate position between its flush and its perpendicular positions, and may be operated by a servo or stepping motor controlled by the computer in accordance with shaft or wind speed.

One control arrangement is shown in FIG. 11 adapted for constant tip speed ratio control in which the ratio of the blade tip speed to the wind speed is maintained constant by adjusting the torque reaction on the shaft of a fixed pitch turbine.

Shaft speed is sensed by tachometer 111, the value being fed to the computer 113 which adjusts torque reaction by a suitable controller 114 to maintain a constant tip speed ratio as shown on the graph, FIG. 12. This can be done in various ways. One way is to have the turbine 110 drive a hydraulic pump arrangement such as a variable displacement e.g. variable angle swash plate pumps 115, the controller 114 being a swash plate angle controller. Or the numeral 115 might indicate a generator, the controller 114 then acting to cut in more coils as shaft speed increases to increase the power take-off of the generator appropriately to constant tip speed ratio operation.

The spoilers are deployed when a maximum permitted shaft speed '$s_{max}$' is exceeded (see FIG. 12, which depicts constant tip speed ratio operation with shaft speed S plotted against wind speed W).

The output of the hydraulic pump arrangement or generator 115 is converted to constant (e.g. mains) frequency electric current by a generator 121 driven by a variable displacement motor 122 (such for example as a variable angle swash plate motor) or by a static inverter 123.

An alternative arrangement is shown in FIG. 13 in which a constant speed wind turbine 131 drives a generator 132 directly to produce constant frequency electric current. The blades are variable pitch blades, the pitch being controlled by pitch controller 133 so as to maintain constant shaft speed as monitored by tachometer 134. Instantaneous overspeed or excess torque due to wind gusting is detected by the tachometer 134 and/or strain gauges or other detectors 135 and cause the computer 136 to actuate the spoilers. One of three spoilers per blade can be actuated at a first level of excess torque, for example, the other two spoilers per blade being cut in at higher levels.

Active spoilers under the control of a computer as described can of course also be combined with the deep spar spoiler arrangement illustrated to give active overspeed control as well as the facility to control the turbine automatically in down-wind operating conditions without the need to have an arrangement pointing the turbine into the wind.

In contrast to blade pitch varying arrangements, active, low pressure side spoilers can be operated very quickly in response to wind velocity changes, and, of course, fixed spoilers on the normally high pressure side deploy instantly in abnormal operation. In consequence, the transmission may be lightened and simplified and the generator may not need to be so highly rated as with conventional wind turbines. The spoilers of the invention, whether active or inactive, do not interfere with the ordinary operation of the turbine, and the invention permits also of stronger, yet lighter and less costly blade construction.

I claim:

1. A wind turbine blade having an envelope which defines an airfoil profile having, in normal operation, a first, high pressure side, a second, low pressure side, and further having a leading edge and a trailing edge, which edges define an airfoil chord line extending between them, and comprising a blade structure incorporating a fixed blade spar which extends outwardly on said first side from within the blade envelope and perpendicularly across said chord line to a position with respect to the blade cross-section which is external of the blade surface and spaced from said airfoil profile, said blade spar comprising a strengthening member mounted along the length of the blade and disposed to disrupt air flow over the blade only in the event that the instantaneous wind direction is reversed so that said first side becomes the low pressure side.

2. A wind turbine blade according to claim 1, said blade spar having a greater depth than the depth from said first to said second side and extending from said second side to beyond said first side.

3. A wind turbine blade according to claim 2, said spar being about twice the depth of the blade from said first to said second side.

4. A wind turbine blade according to claim 1, said spar comprising a rigid plate extending substantially perpendicularly to said airfoil chord.

5. A wind turbine blade according to claim 1, said spar comprising a box section.

6. A wind turbine blade according to claim 1, said spar comprising a triangular section having a base adjacent the said second side and an apex projecting from said first side.

7. A wind turbine blade according to claim 1, said first side of said blade being substantially open between the leading and trailing edges of the blade.

8. A wind turbine blade according to claim 1, said blade being essentially of a conventional airfoil section forward of said spar and essentially comprising only the low pressure side of a conventional airfoil section aft of said spar.

9. A wind turbine blade according to claim 1, said blade having spoiler means on said second side deployable between an inactive position during normal operation and an active position during abnormal (high speed) operation so as to extend from said second side (while said second side remains the low pressure side) to retard the blade.

10. A wind turbine blade according to claim 9, including deployable spoiler means comprising a plate member lying in its inactive position flush with the surface of said second side and in its active position standing up from said second side substantially perpendicular thereto.

11. A wind turbine blade according to claim 10, further comprising means for actuating said spoiler means, said actuating means including motor means disposed inboard of the blade.

12. A wind turbine blade according to claim 11, said motor means operating winch means attached by a cable member to said deployable spoiler means.

13. A wind turbine blade according to claim 10, including means for deploying said deployable spoiler means under centrifugal force.

14. A wind turbine blade according to claim 10, including resilient bias means for deploying said deployable spoiler means.

15. A wind turbine blade according to claim 9, comprising a plurality of independent spoiler sections disposed radially of said blade on said second side.

16. A wind turbine blade according to claim 15, including means for deploying said independent sections to their active positions progressively from inboard to outboard of the blade at increasing blade speeds.

17. A wind turbine blade according to any one of claims 9 to 16, fail-safe means for deploying the spoiler means in the event of system malfunction.

18. A wind turbine blade according to claim 17, comprising electrically energised means holding said spoiler means in their inactive position against a bias so that on electric supply failure the spoiler means are deployed to their active position.

19. A wind turbine comprising at least one wind turbine blade having an envelope which defines an airfoil profile having, in normal operation, a first, high pressure side, a second, low pressure side, and further having a leading edge and a trailing edge, which edges define an airfoil chord line extending between them, and comprising a blade structure incorporating a fixed blade spar which extends outwardly on said first side from within the blade envelope and perpendicularly across said chord line to a position with respect to the blade cross-section which is external of the blade surface and spaced from said airfoil profile, said blade spar comprising a strengthening member mounted along the length of the blade and disposed to disrupt air flow over the blade only in the event that the instantaneous wind direction is reversed so that said first side becomes the low pressure side.

20. A wind turbine according to claim 19, connected to drive an electric generator.

21. The wind turbine according to claim 19, wherein said blade structure has spoiler means on said second side deployable between an inactive position during normal operation and an active position during abnormal, high speed operation so as to extend from said second side, while said second side remains the low pressure side, to retard the blade, and said wind turbine further comprises speed sensing means actuating said spoiler means to control turbine speed.

22. A wind turbine according to claim 19, being a constant speed turbine.

23. A wind turbine according to claim 19, being a constant tip speed ratio turbine.

24. A wind turbine blade according to claim 7 wherein said spar comprises a blade spar or part thereof.

25. A wind turbine according to claim 7 wherein said spar comprises a rigid plate extending substantially perpendicular to the chord of an airfoil section defined by said second side.

26. A wind turbine blade according to claim 7 wherein said spar comprises a box section.

27. A wind turbine blade according to claim 7 wherein said spar comprises a triangular section having a base attached to said blade and an apex projecting away from said open side.

* * * * *